United States Patent [19]

Arendt

[11] Patent Number: 4,950,702
[45] Date of Patent: Aug. 21, 1990

[54] POLYVINYL RESIN PLASTISOL COMPOSITIONS

[75] Inventor: William David Arendt, Mundelein, Ill.

[73] Assignee: Velsicol Chemical Corporation, Rosemont, Ill.

[21] Appl. No.: 281,218

[22] Filed: Dec. 8, 1988

Related U.S. Application Data

[63] Continuation-in-part of Ser. No. 69,482, Jul. 2, 1987, abandoned.

[51] Int. Cl.$^5$ ............................................... C08K 5/09
[52] U.S. Cl. ..................................... 524/292; 524/287
[58] Field of Search .............................. 524/287, 292

[56] References Cited

U.S. PATENT DOCUMENTS

| | | | |
|---|---|---|---|
| 4,435,534 | 3/1984 | Jones | 524/292 |
| 4,489,188 | 12/1984 | Jones | 524/292 |

FOREIGN PATENT DOCUMENTS

| | | | |
|---|---|---|---|
| 0014648 | 2/1977 | Japan | 524/287 |
| 0243138 | 12/1985 | Japan | 524/292 |

*Primary Examiner*—Joseph L. Schofer
*Assistant Examiner*—Peter D. Mulcahy
*Attorney, Agent, or Firm*—Allegretti & Witcoff, Ltd.

[57] ABSTRACT

This invention discloses new plastisol compositions characterized by low viscosity at both low and high shear rates comprising a polyvinyl resin plasticized with dipropylene glycol monomethyl ether benzoate or tripropylene glycol monomethyl ether benzoate.

2 Claims, No Drawings

POLYVINYL RESIN PLASTISOL COMPOSITIONS

BACKGROUND OF THE INVENTION

This application is a continuation-in-part of Ser. No. 069,482, filed July 2, 1987 now abandoned. The invention relates to Aromatic Glycol Esters. In particular, it relates to esters which are useful as plasticizers in the preparation of plastisol resins.

OBJECT OF THE INVENTION

An object of the invention is the creation of plasticizers having good compatibility with polyvinyl chloride resins to provide plastisols having low viscosity and low fusion temperatures as compared to prior art plasticizers. Other objects of the invention will become apparent from the ensuing description. The compounds of the invention have the following structural formula:

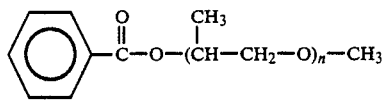

wherein n is 2 or 3.

PREPARATION OF PLASTICIZERS

The compounds of the invention can be prepared by the reaction of benzoic acid and a mono methyl propylene glycol ether. This reaction involves equal moles of each reactant although it is preferable to use excess benzoic acid. Since the reaction is a condensation reaction, it is preferred to continuously remove the water of reaction. Various temperatures up to about 240° F. are sufficient although other temperatures can be used. It is preferred to use a condensation catalyst, such as zirconium carbonate, so as to achieve yields. Other reaction variables that can be used include the presence of an azeotrope such as cyclohexane, but are not necessary for the formation of the compounds of the present invention.

Commercial glycol ethers suitable for use in the invention are actually mixtures of various isomers due to the procedures used in the manufacture of the precursor glycols. Consequently, the products of the present invention when prepared on a commercial basis will be a mixture of compounds having the structural formula (I). There is no need to separate this mixture into its individual components since the mixture itself can be used for the purpose of the invention. Furthermore, such separation techniques are costly and since they are not necessary, it is more economical not to isolate the isomers found in this reaction. Thus, throughout this patent, when discussing this reactant, it is to be understood that the monoalkyl glycol ethers identified includes isomeric mixtures since those skilled in the art recognize that the commercially available materials are actually mixtures of the isomers.

EXAMPLE 1

Preparation of Dipropylene Glycol Monomethyl Ether Benzoate

Dipropylene glycol monomethyl ether (444.6 grams; 3.0 mol), benzoic acid (373.7 grams; 3.06 mol), toluene (50 ml) and zirconium carbonate (2.0 grams) were placed into a 200 ml, 3-necked round bottom flask equipped with stirrer, thermometer, heating mantle, Dean Stark water trap, condenser and 10" Vigneux column. The reaction temperature was 180° C. at the beginning of the reaction and 217° C. after 6.5 hours with stirring. During that time, water (44 mls) was removed. The reaction was continued the next day for 2.5 hours at 224°-226° C. with the removal of water (56 mls.). The reaction mixture was washed at 95°-100° C. three times with sodium carbonate (15%) and then washed with water (400 ml). Then additional water (200 ml) was added and the product separated and dried at 125°, cooled to 100° C. and filtered. The desired product (694.6 grams) was obtained representing a yield of 91.8%. It assayed 99.5% with the following properties:

| | |
|---|---|
| Hydroxyl No. | 8.7 mg. KOH/gram |
| Acidity | <0.01% |
| Color | 175 APHA |
| Moisture | 0.03% |

EXAMPLE 2

Preparation of Dipropylene Glycol Monomethyl Ether Benzoate

Example 1 was repeated at higher temperatures. This reaction was begun at 182° C. and after six hours the reaction temperature was 230° C. Water (57 ml.) was removed during the six hour reaction time. The product was stripped of benzoic acid (2.68 grams) at 168° C. @48 mm Hg. It was then washed with sodium carbonate (200 ml; 15%) at about 95° C. and then a second time with sodium carbonate (50 ml; 15%) at 95°-100° C. After being separated, it was washed with water (680 mls), dried and filtered. The desired product (702.6 grams) was obtained representing a yield of 92.8%. It assayed 99.5% with the following properties:

| | |
|---|---|
| Hydroxyl No. | 7.6 mg. KOH/gm |
| Color | 40 APHA |
| Acidity | 0.01% |
| Moisture | 0.04% |

EXAMPLE 3

Preparation of Dipropylene Glycol Monomethyl Ether Benzoate

Example I was repeated using 100 ml of toluene. The reaction was begun at 165° C. and continued for four hours when the temperature was 234° C. and water (57.5 ml) had been removed. It was then cooled to 160° C. and sodium carbonate (100 ml; 15%) solution was added and the solution washed at 100° C. for 15 minutes. The reaction mixture was separated and water (100 ml) was added after 15 minutes of stirring at 80° C. Then sodium carbonate (100 ml; 15%) was added and stirred for 15 minutes at 80° C. Then the desired product was separated. It assayed 100% with the following properties:

| | |
|---|---|
| Hydroxyl No. | 13.0 mg. KOH/gm |
| Color | 175 APHA |
| Acidity | 0.04% |
| Moisture | 0.06% |

EXAMPLE 4

Preparation of Tripropylene Glycol Monomethyl Ether Benzoate

Tripropylene glycol monomethyl ether (841.6 grams; 3.39 mol), benzoic acid (501.7 grams; 3.46 mol), zinc carbonate 13.5 grams) and toluene (100 ml) were placed into a two liter, three-necked round bottom flask equipped with stirrer, 10" Vigreux column, Dean Stark trap, condenser, heating mantle and thermometer. The reaction temperature was 173°.C at the beginning of the reaction and 235° C. after six hours and 48 minutes. During that time, water (70 ml) was removed. The reaction was continued the next day at 214° C. for an additional three hours and 45 minutes removing additional water (35 ml). Toluene was removed at 65° C. @ 45 mm Hg. The product was washed first with sodium carbonate (170 ml; 15%) at 95°-100° C. for 30 minutes, then with sodium carbonate (22 ml; 15%) and sodium hypochlorite (50 ml), then with sodium carbonate (22 ml; 15%) and sodium hypochlorite (25 ml) with water (300 ml) and finally a second time with water (300 ml). It was dried at 135° C. and filtered to give the desired product (1162.9 grams; 93.6% yield). The product assayed with the following properties:

| | |
|---|---|
| Hydroxyl No. | 8.0 mg KOH/gm |
| Color | 90 APHA |
| Acidity | 0.03% |
| Moisture | 0.03% |

SUMMARY OF THE INVENTION

These benzoates are useful in preparing plastisols or organosols from polyvinyl chloride paste resins. The plasticizer wets the resin particles at room temperature and slowly solvates the resin. These stable dispersions have a viscosity which permits pouring into molds or the like to make articles by casting o slush-molding. Small amounts of solvents which evaporate may be added for viscosity control but are not necessary since the plasticizer alone produces dispersions of desirable viscosity. Plastisols using the plasticizers of the invention can be gelled at relatively low temperatures. Gelation occurs below 150° F. After the resin has been fused at about 300°-350° F. for 15 minutes, the resins achieve maximum physical properties. The plasticizer does not bleed from the resin but is wholly absorbed because of its excellent compatibility.

The polyvinyl chloride resin plastisols prepared using plasticizers of the invention are characterized by excellent rheological properties, both at high and low shear ratios. This characteristic is advantageous in preparing vinyl flooring where the liquid plastisol is spread coated on a substrate and gelled. The vinyl sheet is rolled up after gelation but before final fusing. Low viscosity and low temperature gelation is an important advantage provided by the plastisol compositions of this invention. The viscosity and gelation characteristics are also important in glove dipping where fabric gloves are dipped into the plastisol resin, gelled and then fused.

The polyvinyl chloride resins may be homopolymers or copolymers with vinyl acetate or mixtures thereof. A typical homopolymer of high molecular weight is sold by B. F. Goodrich Company as GEON 121. This resin is particularly useful for dipping, slush, and rotational molding, spread coating, and in preparing caulks and sealants. It is a fine white powder having a particle size of 100% through a 200 mesh screen and an inherent viscosity of 1.20 (ASTM-D-1243-60-A).

PRIOR ART

Benzoic acid derivatives for plasticizing polyvinyl chloride resins are known such as diethylene glycol dibenzoate and dipropylene glycol dibenzoate. These plasticizers produce plastisol resins which have a much higher viscosity than those using the plasticizers of the invention, both at low shear and high shear. Because of the similarity in the chemical structures, it was surprising that the monomethyl, mono benzoate produces significantly lower viscosities than the dibenzoate.

SPECIFIC EXAMPLES

A typical plastisol compound prepared in accordance with the invention contains 100 parts by weight of polyvinyl chloride resin 50-75 parts of the plasticizer of the invention and 3 parts by weight of a stabilizer, preferably a barium/cadmium phenolate.

To demonstrate the usefulness of the present plastisol compounds, plastisol resins were prepared using the following formulation:

| | |
|---|---|
| Polyvinyl chloride homopolymer | 100 parts by weight |
| Plasticizer | 70 parts by weight |
| Stabilizer | 3 parts by weight |

The composition identified as A (prior art) in the tables below was prepared using dipropylene glycol dibenzoate as the plasticizer. Composition B utilizes diethylene glycol monomethyl ether benzoate as the plasticizer and composition C utilizes tripropylene glycol monomethyl ether benzoate as the plasticizer.

Plastisols prepared from the formulations set forth above were cast into sheets having a thickness of 3.2 mm and fused for 15 minutes at 350° F. The tensile strength at break, the modulus and elongation were determined in accordance with ASTM standard test method D638-82 with the result shown in Table I.

TABLE I

| | TENSILE DATA | | |
|---|---|---|---|
| | A | B | C |
| Tensile at Break | 2775 | 2119 | 1931 |
| 100% Modulus PSI | 950 | 602 | 687 |
| Elongation % | 351 | 396 | 340 |

After compositions A, B and C had been mixed at room temperature, the viscosity of each was determined in accordance with ASTM standard test designation D-182466 after standing for 1 hr. 24 hrs. and 7 days. This test determines the apparent viscosity of plastisols at low shear rates using the Brookfield viscometer. The data for compositions A, B and C above, are as follows:

TABLE II

| BROOKFIELD LVT VISCOSITY IN CENTIPOISES | | | |
|---|---|---|---|
| RPM | A | B | C |
| | 1 HR 23° C. | | |
| .6 | 3750 | 750 | 750 |
| 1.5 | 3700 | 600 | 600 |
| 3 | 3650 | 500 | 550 |
| 6 | 3625 | 475 | 475 |
| 60 | 4950 | 398 | 425 |
| | 24 HRS 23° C. | | |

TABLE II-continued

| BROOKFIELD LVT VISCOSITY IN CENTIPOISES | | | |
|---|---|---|---|
| RPM | A | B | C |
| .6 | 4500 | 1000 | 1000 |
| 1.5 | 4400 | 900 | 800 |
| 3 | 4300 | 750 | 650 |
| 6 | 4325 | 650 | 500 |
| 60 | 6050 | 530 | 480 |
| 7 DAYS 23° C. | | | |
| .6 | 5750 | 1500 | 1250 |
| 1.5 | 5800 | 1400 | 900 |
| 3 | 5700 | 1300 | 800 |
| 6 | 5700 | 1150 | 675 |
| 60 | — | 880 | 600 |

The viscosity of the above compositions A, B & C were determined in accordance with ASTM test method D1823-66 for apparent viscosity of plastisols at high shear rates using a Castor-Severs viscometer. After mixing, the composition stood for 1 day at 23° C.

TABLE III

| SEVERS VISCOSITY IN POISES 1 DAY 23° C. | | | |
|---|---|---|---|
| PSI | A | B | C |
| 10 | 323.08 | 29.66 | 41.42 |
| 20 | — | 40.31 | 51.92 |
| 30 | 632.86 | 46.08 | 50.72 |
| 40 | 758.99 | 52.22 | 51.07 |
| 100 | 775.98 | | |

From the data in Tables II and III, it is clear that the plasticizers of the invention (compositions B and C) yield plastisols having significantly lower viscosities than the prior art dibenzoate plasticizer (composition A). It was entirely unexpected that the relatively minor change in the structural formula of the plasticizer would produce such markedly different viscosity figures.

Samples of the fused plastisol resins from compositions A, B and C were placed in an oven at 190° C. to determine heat stability. After about 10 minutes, all samples turned dark amber color.

Composition B gelled at 126° F. Composition C gelled at 150° F. The gel temperature was determined by depositing a thin streak, about ⅛" in width on a temperature gradient hot plate. After 3 minutes, the point of gelation is determined by making closely spaced cross-sectional cuts through the plastisol strip with a thin spatula. The point at which the plastisol ceases to flow together is the gel temperature and is measured with a surface thermometer on the gel plate.

To determine the compatibility of the plasticizer in the resin, a strip of the fused plastisol was rolled tightly in yellow tablet paper and secured with a rubber band. The roll was placed in an oven maintained at 140° F. for a period of 3 days. The sheet was unrolled each day and examined for signs for exudation. None of compositions A, B or C showed any oiliness, neither was there any wetting of the paper. From the test, it can be concluded that the plasticizer is wholly compatible and does not bleed out of the resin.

Another important us of the present compounds is in preparing caulks. The major component of the caulk is the polymer emulsion which generally constitutes 90% by weight of the caulk. An acrylic emulsion is preferably used together with the plasticizer and a thickener. In a typical caulk composition, the plasticizer of the invention is pre-mixed with lesser components such as defoamers, ethylene glycol, sodium lauryl sulfate and then with a portion of the acrylic emulsion. This mixture is then mixed with the remainder of the acrylic emulsion, the defoamer and ammonium hydroxide for a few minutes. A typical formulation and procedure for preparation is as follows:

Premix

| Premix | |
|---|---|
| Solid sodium lauryl sulfate | 1.2 pounds |
| Ethylene glycol | 2.6 |
| Plasticizer Compound of present invention | 13.0 |
| Defoamer | 1.6 |

This premix is then mixed for five minutes with:

| Acrylic emulsion | 338.4 pounds |
|---|---|
| Thickener | 15 |

This mixture is then mixed for an additional five minutes with:

| Acrylic emulsion | 507.5 pounds |
|---|---|
| Ammonium hydroxide | 3.2 |
| Defoamer | 1.6 |

This product is an excellent caulk. As can be seen from this formulation, the presence of the components other than the plasticizer compounds does not vary from the preparation of known caulk formulations. The important fact is that the new compounds of this invention can be used in the preparation of caulks.

I claim:

1. A plastisol composition characterized by low viscosity at both low and high shear rates comprising a resin which is selected from the group consisting of polyvinyl chloride homopolymers and copolymers of vinyl chloride and vinyl acetate plasticized with dipropylene glycol monomethyl ether benzoate or tripropylene glycol monomethyl ether benzoate and in which the plasticizer is present in the amount of 50-75 parts by weight per 100 parts by weight of said resin.

2. The composition of claim 1 in which said plasticizer is present in the amount of 70 parts by weight and also contains 3 parts of a barium/cadmium stabilizer.

* * * * *